Sept. 26, 1961 A. VAN RAAY 3,001,561
PEELING MACHINE
Filed May 4, 1960 2 Sheets-Sheet 1

INVENTOR
ALBERTUS VAN RAAY
BY
ATTORNEYS

Sept. 26, 1961     A. VAN RAAY     3,001,561
PEELING MACHINE

Filed May 4, 1960                              2 Sheets-Sheet 2

INVENTOR,
ALBERTUS VAN RAAY

BY *Tuchof & Asheroff*

ATTORNEYS

United States Patent Office 3,001,561
Patented Sept. 26, 1961

3,001,561
PEELING MACHINE
Albertus Van Raay, Ulft, Netherlands, assignor to N.V. Machinefabriek "Finis," Ulft, Netherlands, a Dutch liability company
Filed May 4, 1960, Ser. No. 26,803
Claims priority, application Netherlands May 6, 1959
8 Claims. (Cl. 146—43)

This invention relates to a peeling machine and more particularly to a machine for peeling tuberous crops and hard fruit or similar articles and more particularly potatoes.

It has been suggested to make a machine for peeling potatoes by providing a cylindrical vessel closed on its under side by a rotating bottom closure, the bottom closure having a number of slots and cutters against the slots. In this manner, as the bottom rotates, the cutters remove the skin from the potatoes with the skin passing through the slots and out of the vessel. This type device is inefficient since the peeling action is carried out solely by the cutters in the bottom of the vessel so that the peeling action takes a relatively long time and requires a relatively high expenditure of energy.

It has been suggested that these disadvantages can be eliminated by providing openings in the side walls of the cylindrical vessel and fitting in these openings rotating cylinders, said cylinders having therein slots and cutters parallel to the axis of said vessel. Such a device has the drawback that a comparatively large percentage of the potatoes is carried by the cylinders into the unavoidable openings between the cylinders and the walls of the vessel and this action flattens the potatoes. In other words, a large portion of the potato is removed by the cutters in addition to the skin.

The present invention avoids the deficiencies of the above-proposed machines. The machine of the present invention, similarly to the above-suggested machines, has a rotating bottom closure, the closure having slots therein with cutters fitted adjacent the slots. In addition to the rotating bottom and cutters, the machine of the present invention is provided with one or more disk cutters rotatably mounted in the side walls of the cylindrical vessel.

The disk cutters mounted in the side walls are constituted by a disk having at least one slot therethrough with a cutter positioned adjacent the slot with the plane of rotation of each disk being substantially parallel to the side wall. Stated differently, the disks rotate about an axis substantially perpendicular to the side wall.

By constructing a machine in this manner, the number of cutters available to peel the potatoes is greatly increased. At the same time, the percentage of flattened potatoes is greatly reduced. The energy required to peel the potatoes is also considerably reduced. The reduction of the energy consumption is largely due to the fact that all the cutters of the disks are constantly in service and are available at all times to peel potatoes. Rotating cylindrical cutters, as above described, are much less efficient since the cutters on the cylinders are only serviceable during the time that the cutters are on the inside of the vessel and are not serviceable when on the outside of the vessel. The disk-mounted cutters according to the present invention are always on the inside of the vessel. Furthermore, cylindrical cutters are subjected to a lateral pressure which tends to reduce the efficiency thereof, whereas the disk cutters according to the present invention, are subjected to substantially equal load on all sides during the peeling operation.

Other aspects and advantages of the present invention will be readily apparent from the following description of exemplary embodiments in connection with the accompanying drawings wherein.

Figure 1:
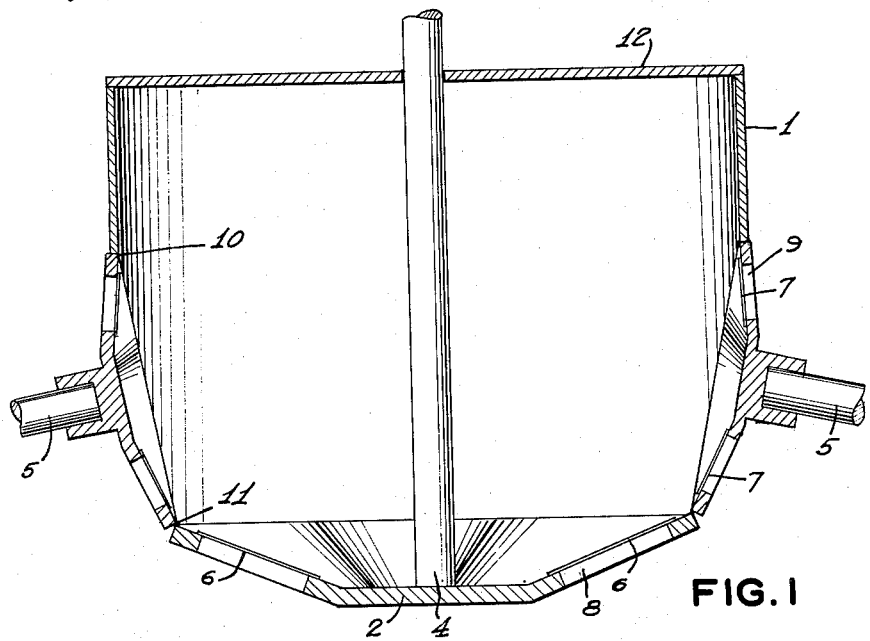
FIGURE 1 shows a cross section of one exemplary embodiment of a potato peeling machine constructed according to the present invention.
Figure 2:
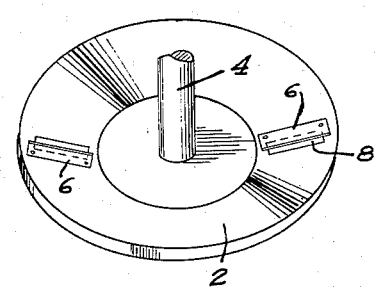
FIGURE 2 shows a perspective view of the bottom cutter of the machine of FIGURE 1.

Referring to FIGURE 1, the machine of the present invention comprises a cylindrical vessel 1 having a rotating bottom closure 2, said closure being mounted at the bottom of a rotating vertical spindle 4. The bottom closure 2 has a plurality of slots 8 therethrough with cutters 6 fitted adjacent the slots (see FIGURE 2). In the side walls of the cylindrical vessel are one or more openings 10, two such openings being illustrated in the machine of FIGURE 1. Rotatably mounted in each of these openings is a disk or plate 3, said plates being rotatably supported by spindles 5, said spindles being substantially perpendicular to the side walls of the cylindrical vessel so that the plane of rotation of the disks are substantially parallel to the side walls wherein the disk is mounted.

Figure 3:
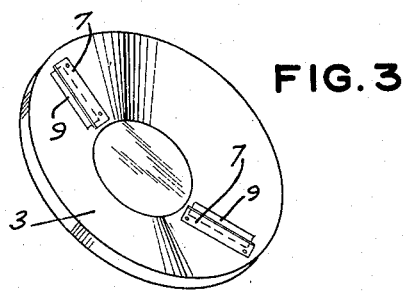
FIGURE 3 shows a perspective view of a side cutter of the machine of FIGURE 1.
Figure 4:
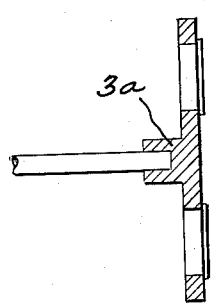
FIGURE 4 shows a cross section of the modified form of a side cutter.

In the embodiment of FIGURES 1 and 3 the disks are slightly concave with the concavities 11 thereof being directed toward the interior of the vessel. Alternatively, as shown in FIGURE 4, each disk may be replaced by disk 3a, which is substantially flat. Each of the disks have therethrough one or more slots, and preferably a plurality of radial slots 9 (see FIGURE 3) with cutters 7 adjacent the slots. In other words, plates 3 have an arrangement of slots and cutters analogous to those in the bottom closure or cutter 2.

The upper opening of the vessel may be closed by cover 12.

In the structure shown in FIGURE 1, the periphery of the disks 3 contact the periphery of the bottom closure at 13, that is, the disks 3 and the closure 2 having a common tangent. In this manner, when spindle 4 is rotated by drive means (not shown), rotation of closure 2 will cause rotation of disks 3. Alternatively, disks 3 may be rotated by independent means (not shown) and may rotate more slowly or more quickly than closure 2. It is also possible to have each of disks 3 rotating at a different velocity from the other.

Figure 5:
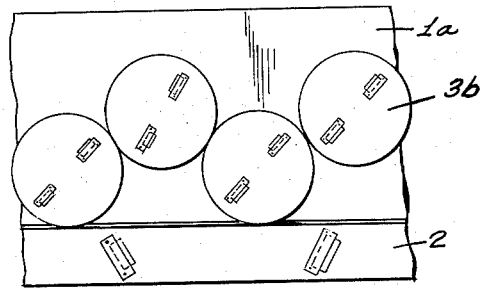
FIGURE 5 is a diagrammatic development, in vertical elevation, of the interior of the vessel showing one arrangement of the side cutters.

In the embodiment illustrated in FIGURE 1, the disks 3 are all of the same size and their spindles 5 are all positioned at the same height. In FIGURE 5 there is shown diagrammatically another construction wherein each of the disks 3b, although the same size, are mounted with the spindles of some disks at a height different from the spindles of other disks.

Figure 6:
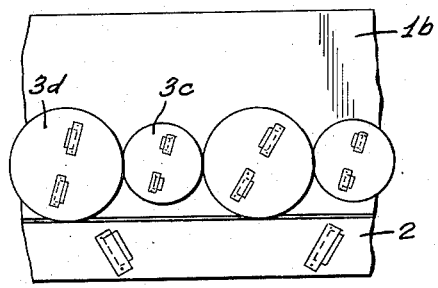
FIGURE 6 is a diagrammatic development, in vertical elevation, of the interior of the vessel showing another arrangement of the side cutters.

In FIGURE 6 there is shown diagrammatically another modification wherein the disks are not all the same size, disks 3c being smaller than disks 3d.

Figure 7:
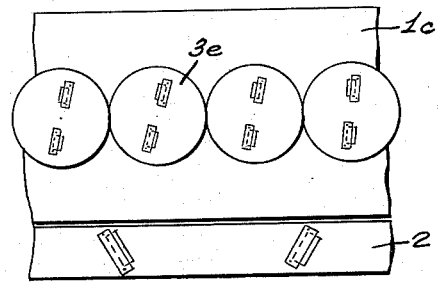
FIGURE 7 is a diagrammatic development, in vertical elevation, of the interior of the vessel showing still another arrangement of the side cuters.

In each of the modifications thus far described, some or all of the disks have their periphery flush with the bottom of the vessel. In FIGURE 7, there is shown diagrammatically another construction wherein the disks are spaced above the bottom edge of the vessel, the disk being identified as 3e. In each of FIGURES 5, 6 and 7 the vessel is identified as 1a, 1b and 1c respectively, while the bottom closure is diagrammatically represented in developed form by the numeral 2.

It is apparent that the present invention comprehends within its scope other variations in addition to the above described modifications. The main concept of the present invention resides in providing a cylindrical vessel having rotatable bottom closure, the bottom closure having slots therethrough and cutters adjacent said slots with at least one opening through the side walls of the vessel and a rotatable disk fitted in each opening, the disk having at least one slot therethrough and at least one cutter adjacent said slot, the disk having a plane of rotation substantially parallel to the side wall of the vessel and means to rotate the bottom closure and the disks. The number of cutters on the bottom closure and the disks may be varied as desired. Similarly, the number of disks may be varied as desired.

When using the machine of the present invention, potatoes are inserted into the vessel, the cover is placed thereover and the power turned on to rotate the bottom closure and the disks. The potatoes are tossed against the cutters of the disks and bottom to remove the skins from the potatoes with the skins passing through the slots to the exterior of the vessel. The action is continued until the potatoes are peeled.

I claim:

1. A machine for peeling tuberous crops, hard fruit and similar articles comprising a cylindrical vessel, a rotatable bottom closure for said vessel, said bottom closure having slots therethrough and cutters adjacent said slots, at least one opening in the side walls of said vessel, a rotatable disk fitted in each opening, each disk comprising at least one slot and cutter adjacent the slot, said disk having a plane of rotation substantially parallel to the side wall, and means to rotate said bottom closure and disks.

2. A machine as recited in claim 1 wherein the disks are concave, the concavity facing the interior of the vessel.

3. A machine as recited in claim 1 where there are a plurality of disks, at least some of said disks having a common tangent with said bottom closure.

4. A machine as recited in claim 3 wherein the disks are driven by said bottom closure.

5. A machine as recited in claim 1 wherein there are a plurality of disks, at least some of said disks being spaced above the bottom of the vessel.

6. A machine as recited in claim 1 wherein there are a plurality of disks, some of said disks having a speed of rotation different from other of said disks.

7. A machine as recited in claim 1 having a plurality of disks some of said disks having larger diameters than other of said disks.

8. A machine as recited in claim 1 having a plurality of disks, each of said disks having a plurality of circumferentially spaced radial slots, a cutter being positioned adjacent each of said slots.

No references cited.